Figure 2A:
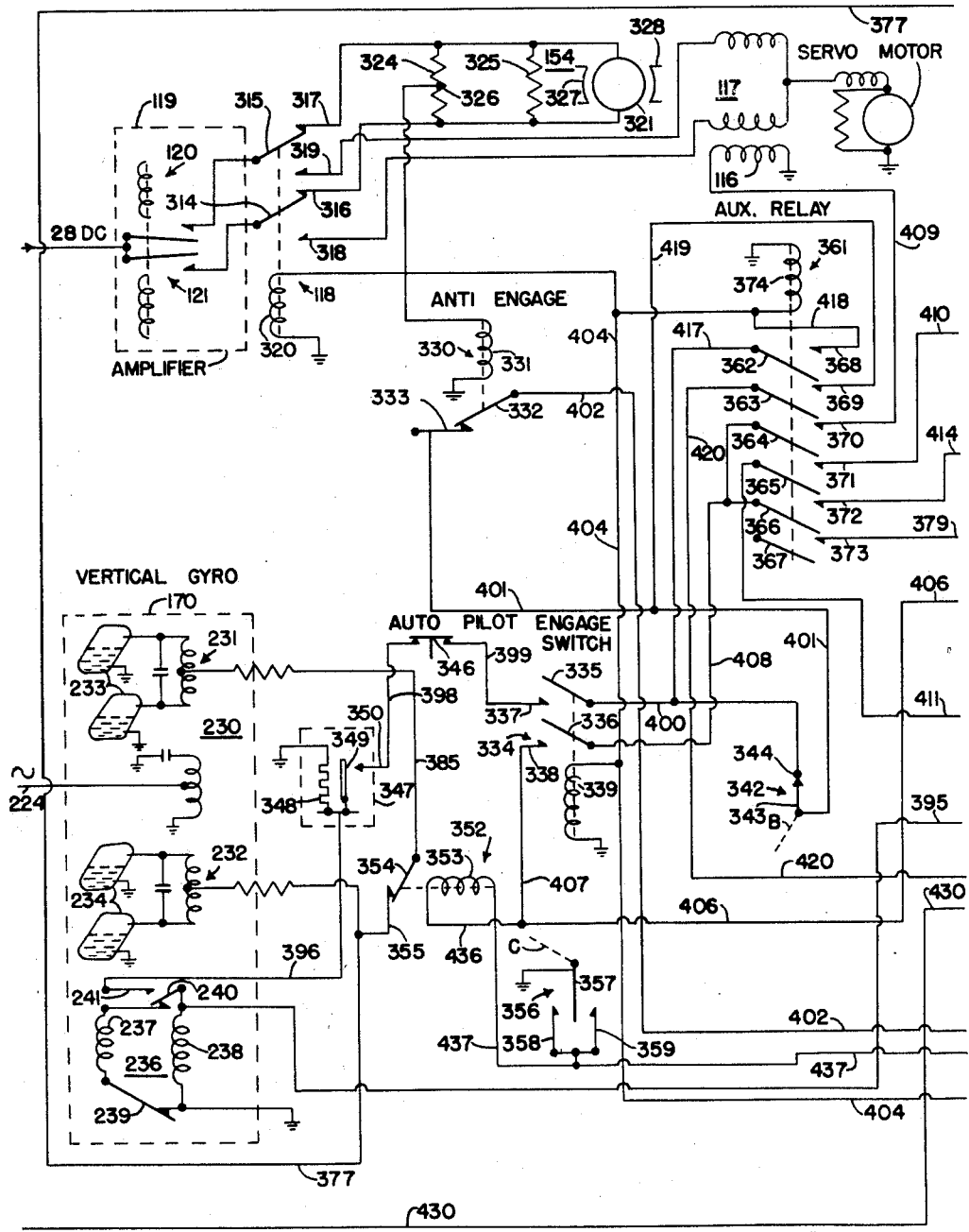

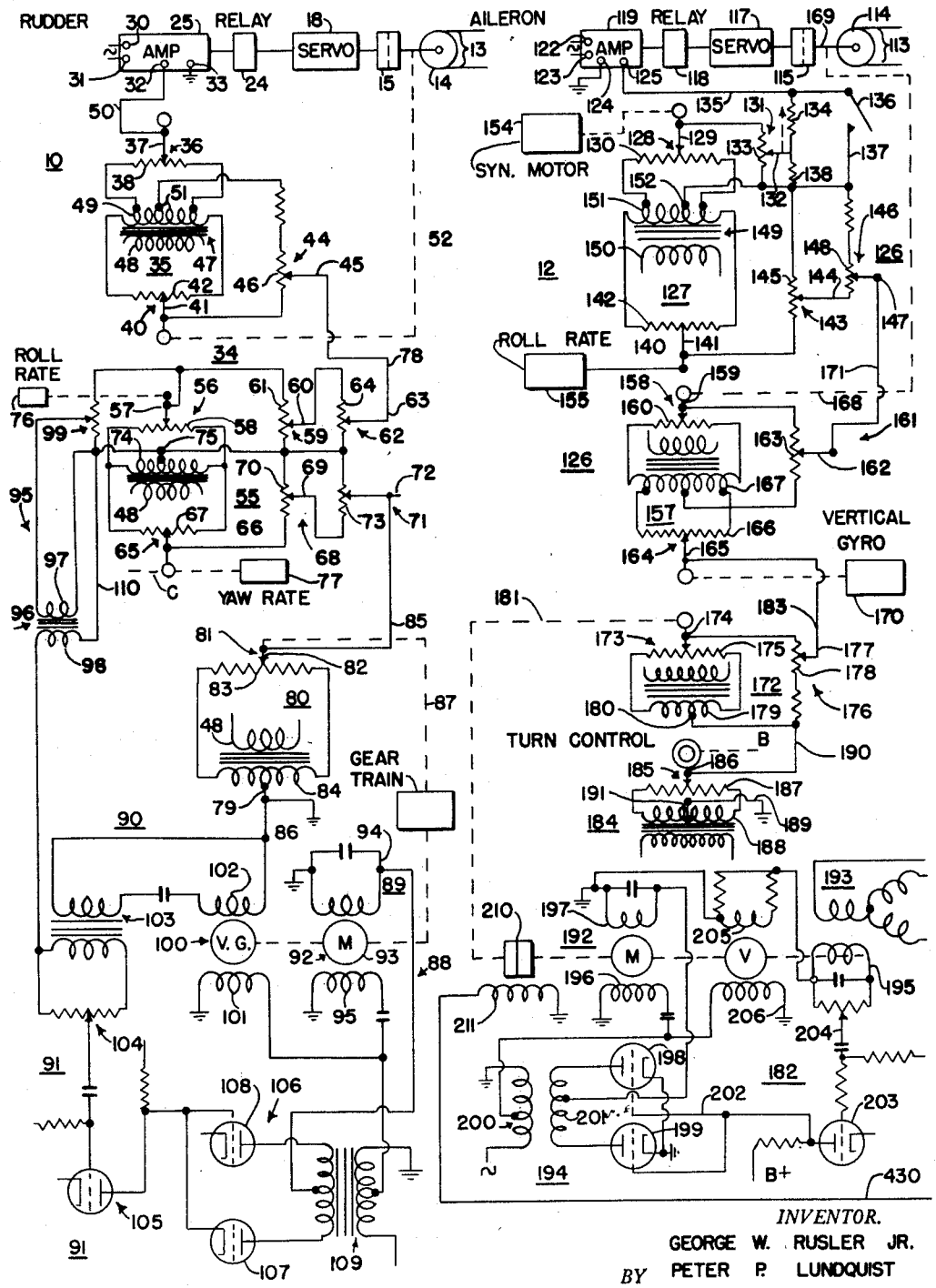

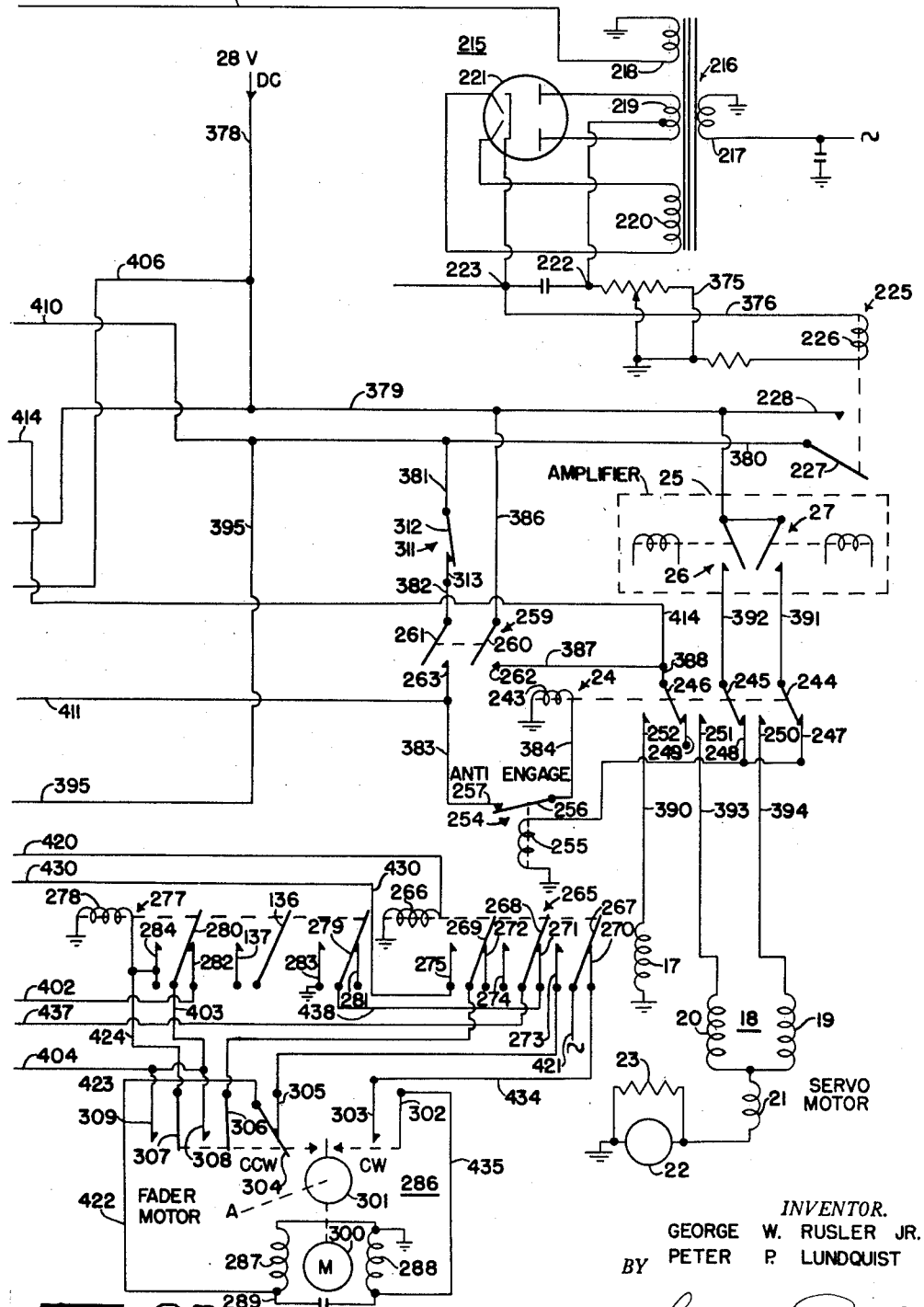

United States Patent Office 2,942,806
Patented June 28, 1960

2,942,806

AUTOMATIC PILOT FOR AIRCRAFT

Peter P. Lundquist, St. Louis Park, and George W. Rusler, Jr., Minneapolis, Minn., assignors to Minneapolis-Honeywell Regulator Company, Minneapolis, Minn., a corporation of Delaware Filed Mar. 11, 1955, Ser. No. 493,672

18 Claims. (Cl. 244—77)

This invention relates to an automatic pilot for aircraft which will permit the human pilot of the aircraft to effect through the automatic pilot a desired attitude and direction of flight of the craft with a minimum of effort and attention.

The invention has been applied to an autopilot which includes balanceable control networks for maintaining craft attitude. When such autopilot is not engaged with the craft control surfaces, a control network may be unbalanced by changes in craft attitude and in order to synchronize the autopilot with the airplane's attitude, a synchronizing signal is constantly supplied to maintain the network in a balanced condition.

A feature of the present invention is an arrangement for fading out the synchronizing signal after the automatic pilot is engaged with the craft so that if the craft is engaged while in an attitude other than a wings level position, the fading out of the synchronizing signal will restore the craft to its wings level position. A further feature of the invention is in permitting manual changes of heading of the craft to be effected through the automatic pilot while the heading stabilizing device is rendered ineffective and also utilizing the arrangement for fading out the syncronizing signal to delay the return of the autopilot to heading stabilizing control until a sufficient time has elapsed to permit the desired manual change in heading to be effected.

A further feature of the invention is the provision of electrical interlocks, generally provided by relays, and mechanical releases to prevent improper engagement of the automatic pilot with the aircraft or to prevent engagement in the event of improper operation of the craft attitude responsive devices.

The above and other features and advantages of the invention will appear more fully hereinafter from a consideration of the accompanying detailed description taken together with the subjoined drawings wherein one embodiment of the invention is illustrated by way of example. In the drawings wherein like reference characters refer to like parts throughout the several views:

Figure 1 is a schematic illustration of an automatic pilot comprising an aileron control channel and a rudder control channel; roll attitude and heading command signals are inserted in the aileron channel, while only those signals necessary to provide turn coordination are inserted in the rudder channel;

Figures 2A and 2B comprise a schematic of novel interlock system, the condition of which determines the engagement of the aileron and rudder channels of the autopilot with aircraft control surfaces.

Figure 1 shows the control signal portion of an automatic pilot for operating the rudder and ailerons of the aircraft. This control signal portion comprises a rudder section 10, and an aileron section 12. The rudder section 10 comprises a servomechanism including a servomotor 18 and a control amplifier 25 therefor. The amplifier 25 is of the electronic type and has an input control signal circuit 34. The control signal circuit comprises a manual trim and servo position network 35, roll rate and yaw rate control network 55, and an integration network 80. More particularly, the rudder surface (not shown) may be operated by cables 13 extending from a cable drum 14 driven through a disconnectible clutch 15 from the servo 18. The servomotor 18 may be reversibly controlled when engaged with its control surface through engage relay 24 by the amplifier 25. The amplifier 25 is of the A.C. discriminator type similar to that disclosed in U.S. Patent No. 2,425,733 to Willis H. Gille et al., dated August 19, 1947. The amplifier comprises terminals 30, 31 connected to an alternating voltage supply and input control signal terminals 32, 33 connected to control signal circuit 34. Amplifier 25 includes a pair of relays alternatively operated in accordance with the phase relationship between the voltage across supply terminals 30, 31 and the voltage across the control circuit terminals 32, 33.

In control circuit 34, the signal generator 35 comprises a trim potentiometer 36 having an adjustable slider 37 and resistor 38; a servo follow-up potentiometer 40 having an adjustable slider 41 and resistor 42; a servomotor ratio potentiometer 44 having an adjustable slider 45 and resistor 46; and a transformer 47 having a primary winding 48 and a secondary winding 49. Since a single primary winding may supply a plurality of secondary windings, in signal generators to be subsequently described, the secondary windings therein may be supplied from the common primary winding 48. Resistor 38 of potentiometer 36 has its ends connected to intermediate points on secondary winding 49 on opposite sides of the center tap 51 thereof. Slider 37 may be manually adjusted to either side of the electrical center of resistor 38. A conductor 50 connects amplifier control circuit terminal 32 and slider 37. Resistor 42 of potentiometer 40 may be connected across the ends of secondary winding 49. Slider 41 may be adjusted in either direction from the electrical center of resistor 42 (which has the same potential as the center tap 51 of secondary winding 49) by a mechanical follow-up connection 52 extending between slider 41 and output shaft 53 of clutch 15. Ratio potentiometer 44 may have its resistor 46 connected across center tap 51 and slider 41. Tap 45 may be manually adjusted along resistor 46.

Continuing to network or signal generator 55, it includes a potentiometer 56 having a slider 57 and resistor 58; a roll rate adjusting potentiometer 59 having an adjustable tap 60 and resistor 61; a roll rate airspeed compensation potentiometer 62 having an adjustable tap 63 and resistor 64; a yaw rate potentiometer 65 having an adjustable slider 66 and resistor 67; a yaw rate adjusting potentiometer 68 having an adjustable tap 69 and resistor 70; a yaw rate airspeed compensation potentiometer 71 having an adjustable slider 72 and resistor 73; and a secondary winding 74 of the transformer having a center tap connection 75. Resistor 58 of potentiometer 57 may be connected across the secondary winding 74. The slider 57 may be adjusted in either direction from the electrical center of resistor 58 having the same potential as the center tap 75 of secondary winding 74 by a roll rate gyroscope 76. The roll rate gyroscope may be of the type conventional in the art and the magnitude of displacement of slider 57 from the electrical center of resistor 58 varies in accordance with the magnitude of the rate of roll of the craft. The direction of such displacement from the electrical center depends upon the direction in which the craft is rolling. Resistor 61 has one end connected to slider 57 and its opposite end connected to the center tap 75. In turn, resistor 64 has one end connected to adjustable tap 60 and its opposite end to the center tap 75. A conductor 78 connects adjustable slider 63 of potentiometer 62 with adjustable tap 45 of potentiometer 44 in signal generator 35. Resistor 67 of potentiometer 65 is connected across the ends of secondary winding 74. Slider 66 is adjusted in either direction from the electrical center of resistor 67 by a yaw rate gyroscope 77. This yaw rate gyroscope is of the type conventional in the art and the operation is such that slider 66 is displaced in a direction from the electrical center of resistor 67 in accordance with the direction in which the craft is turning about its vertical axis and the extent of such displacement of slider 66 depends upon the rate of turn of the craft. Resistor 70 has one end connected to center tap 75 and its opposite end to slider 66. In turn, resistor 73 has one end connected to center tap 75 and its opposite end to adjustable tap 69. The sliders 60 and 69 may be manually adjusted whereas the sliders 63 and 72 may be adjusted automatically in accordance with changes in airspeed of the craft.

The signal generator 80 comprises an integration potentiometer 81 having an adjustable slider 82 and resistor 83 and a secondary winding 84 of the transformer having a center tap 79. Resistor 83 is connected across the ends of secondary winding 84 and slider 82 may be positioned along resistor 83 in either direction from the electrical center thereof, having a potential the same as center tap 79, by an operating shaft 87 extending from an integration device 88. A conductor 85 connects slider 82 and adjustable slider 72 of potentiometer 71. A conductor 86 extends from center tap 79 to ground with a return to amplifier ground terminal 33. Thus we have considered in detail the elements of the control circuit 34 and have traced the circuit from one amplifier terminal 32 to the amplifier ground terminal 33.

The integrator 88 is of the motor operated type and comprises an operating section 89, a control signal section 90, and an amplifier having an amplifier section 91 and discriminator section 106. The operating section 89 comprises a motor 92 which may be a capacitor type induction motor comprising a rotor 93, an amplifier output energized winding 94, and a line energized winding 95. The motor operates through a gear train the operating shaft 87 for slider 82. The control signal circuit 90 includes a velocity signal generator 100, a roll rate signal providing device 95, the yaw rate signal generator 65, and the integration signal generator 80. The roll rate signal providing device 111 comprises an isolating and phase reversing transformer 96 having a primary winding 97 and secondary winding 98. The primary winding 97 is energized from a voltage dividing potentiometer which is connected between center tap 75 of secondary winding 74 and roll rate gyro operated slider 57. The velocity signal generator 100 is operated by motor 92 and the velocity signal generator includes a line winding 101 and a secondary winding 102. The voltage induced in winding 102 is in proportion to the speed of operation of the velocity signal generator 100 from motor 92. The velocity signal induced in winding 102 is applied through an isolating transformer 103 to a voltage divider 104. Thus the control section 90 for the voltage amplifier section extends from voltage dividing potentiometer 104 to the control grid of the amplifier section and also includes a circuit from ground conductor 86, signal generator 80, conductor 85, adjustable tap 72, signal generator 65, center tap 75, conductor 110, secondary winding 98 of transformer 96, to voltage divider 104. The amplifier section 91 has its output applied to a pair of triodes 107, 108 of discriminator 106 having their plates conventionally connected to opposite ends of a secondary winding of a transformer 109. The output of the discriminator section 106 is applied to the amplifier energized motor winding 94.

In the aileron control section 12 of the automatic pilot, the aileron control surfaces (not shown) of the aircraft are operated by cables 113 extending from a cable drum 114 operated through a disconnectible clutch 115 from an aileron servomotor 117. Motor 117 is reversibly controlled when engaged through aileron engage relay 118 by an aileron servomotor amplifier 119. Aileron servomotor amplifier 119 is similar to rudder servomotor amplifier 25 and comprises alternating voltage input terminals 122, 123 connected to a suitable supply and alternating voltage control signal input terminals 124, 125 which are connected to a control circuit 126.

The control circuit 126 or balanceable network includes a network synchronizing-roll rate signal generator 127; an aileron servo balance-vertical gyro roll attitude network 157 a heading error signal generator 172, and a manually operable turn control network 184. Signal generator 127 includes a synchronizing potentiometer 128 having an adjustable slider 129 and resistor 130; a fader potentiometer 131 having a slider 132 and resistor 133; a pair of resistors 138, 134, a roll rate potentiometer 140 having a slider 141 and resistor 142, roll rate to aileron adjusting potentiometer 143 having a slider 144 and resistor 145, roll rate to aileron airspeed compensation potentiometer 146 having a slider 147 and resistor 148, and a transformer 149 having a primary winding 150 and secondary winding 151. In the aileron channel 12 similar to that in rudder channel 10, a single primary winding of a transformer is utilized to supply several secondaries in a manner more fully described below. Potentiometer resistor 130 is connected across intermediate points of secondary winding 151 equidistant from the center tap 152 thereof. Prior to engagement, slider 129 is positioned in either direction along resistor 130 from the electrical center thereof, having a potential equal to that of the center tap 152, by a synchronizing motor 154. Fader potentiometer resistor 133 has one end connected to slider 129 and its opposite end connected to center tap 152. Extending from center tap 152 in series relation are resistors 138, 134 and conductor 135 which has its opposite end connected to amplifier input terminal 125. Slider 132 is operated by a fader motor along resistor 133 in a manner more fully to be described subsequently. The slider 132 is connected to the junction of resistors 138 and 134. Resistors 138 and 134 may be bypassed by an operable arm 136 and its related contact 137 of a synchronizing relay 277 to be described hereinafter. Resistor 142 is connected across the ends of secondary winding 151 and its slider 141 is operated in either direction from the electrical center of resistor 142 by a conventional roll rate gyroscope 155 in accordance with the craft roll rate. Resistor 145 of potentiometer 143 has one end connected to center tap 152 and its opposite end to slider 141. Resistor 148 in turn has one end thereof connected to slider 144 of potentiometer 143 and its opposite end connected to center tap 152. In signal generator 157, resistor 160 is connected across the ends of transformer secondary winding 167, and its slider 159 is positioned in either direction from the electrical center of resistor 160 by a servomotor follow-up connection 168 connected to the output side 169 of clutch 115. Resistor 163 has one end connected to slider 159 and its opposite end to a center tap of secondary winding 167. A conductor 171 connects slider 147 and adjustable tap 162. Potentiometer resistor 166 has its ends connected to intermediate points on secondary winding 167 equidistant electrically from the center tap of the secondary winding. Slider 165 is displaced in either direction from the electrical center of resistor 166 by conventional vertical gyroscope 170. Displacement of slider 165 is in direction and magnitude dependent upon the direction and magnitude of the change in roll attitude of the craft from a normal position. This normal position is generally taken at a wing's horizontal attitude. Signal generator 172 has a resistor 175 of potentiometer 173 connected across secondary winding 179. Slider 174 of the potentiometer 173 is displaced in either direction from the electrical center of the resistor by mechanical operating connection 181 extending from a compass coupler arrangement 182. The displacement of slider 174 is in accordance with the deviation of the craft from a selected heading. A conductor 183 connects potentiometer slider 165 and an adjustable tap 177 of potentiometer 176 which has its resistor also including a fixed series resistor connected between slider 174 and the center tap 180 of the secondary winding 179. Signal generator 184 has a potentiometer resistor 187 of a potentiometer 185 connected across a transformer secondary winding 188. Slider 186 of potentiometer 185 may be manually displaced along resistor 187 in either direction from the electrical center thereof, which center has a potential corresponding to that of the center tap 191 of secondary winding 188. A conductor 190 extends from center tap 180 to slider 186, and a ground conductor 189 connects center tap 191 to grounded terminal 124 of amplifier 119 to complete the signal circuit 126.

The compass coupler 182 is in the nature of a "repeater" and comprises an operating section 192, a signal section 193, and an amplifier-discriminator section 194. The operating section 192 comprises a two phase motor of the capacitor induction type having a line energized winding 196 and an amplifier energized winding 197. The motor operating through a magnetic clutch 210 having an energizing winding 211, drives the operating means 181 for slider 174. The motor 192 is reversibly controlled from discriminator tubes 198, 199 of the amplifier-discriminator section 194. The direction of rotation of motor 192 is dependent upon which triode section 198, 199 is operative. One or the other of the tube sections may be operative depending upon the phase relationship between the voltage across a secondary winding 201, of a transformer 200, which has its opposite ends connected to the plates of triode sections 198, 199 and the phase of the control signal supplied from conductor 202 to the grids of tubes 198, 199.

The control voltage supplied to conductor 202 is derived from an amplifying tube 203 which has its grid connected through a capacitor to a conductor 204 forming part of the signal circuit 193. Control signals are derived from a synchro winding 195 and a secondary winding 205 of a velocity signal generator having its primary winding 206 connected to the A.C. supply. Compass couplers of this type are well known and the present coupler is similar to that in U.S. Patent No. 2,516,796 dated July 25, 1950. The synchro winding 31 of the patent corresponds with the synchro winding 195 of the subject application. Similarly the coupler of the aforesaid patent includes a magnetic clutch having a coil 67 corresponding with clutch winding 211 herein.

Figures 2A and 2B together as stated comprise the power circuit or what may be considered the coupling circuit for coupling the automatic pilot to the rudder and aileron control surfaces of the craft. In Figure 2B the clutch operating winding 17 constitutes part of clutch 15 in Figure 1. The servomotor 18 comprises alternatively energizable field windings 19, 20 which are connected in series with a pulsing clutch winding 21 and armature winding 22. The winding 22 is shunted by a resistor 23 to limit the torque output of the motor 18. The operation is such that on energization of the pulsing clutch winding 21 along with the armature and a field winding of the motor 18, the control surface may be operated but when no longer energized, the control surface is held in a locked position. This operation is not original in the present embodiment.

The amplifier 25 includes the alternatively operable relays 26, 27. For the purpose of supplying a D.C. bias control voltage to amplifier 25 as more fully disclosed in the aforesaid patent of Willis H. Gille et al. there is provided a rectifier 215. Operation of the rectifier 215 is provided by a transformer 216 having a primary winding 217 connected to the alternating voltage supply and inductively associated with secondary windings 218, 219, and 220. The winding 220 energizes the heater for the cathode element of a full wave rectifier tube 221 which has its two plates connected to the ends of the secondary winding 219. A center tap of winding 219 is connected to one output terminal 222 of the rectifier and the cathode element is connected to the other output terminal 223 of the rectifier. Connected across the output terminals 222, 223 of the rectifier is an operating winding 226 of an alternating voltage failure relay 225. The relay includes a relay arm 227 contacting with contact 228 when the relay is energized.

The secondary winding 218 serves to energize the erection motors of vertical gyroscope 170, Figure 2A. The vertical gyroscope includes gravitational controlled erecting means for the rotor comprising erection motors 231, 232 controlled respectively by mercury levels 233, 234. The motor 231 is identified as the roll erection motor and motor 232 as the pitch erection motor. In other words motor 231 erects the gyro rotor with respect to the roll axis of the craft and motor 232 erects the gyro with respect to the pitch axis of the craft. Such gyroscope rotor erecting means exists in the prior art as evident by the U.S. Patent No. 2,607,231 to J. F. Schoeppel et al. In addition to including erecting means for the gyroscope rotor there is also included a caging mechanism such as more fully disclosed in U.S. Patent No. 2,645,129 to H. L. Brown. This caging mechanism of the patent includes as is shown herein as mechanism 236 a stepping solenoid 237, a holding solenoid 238, a stepping switch 239, and a limit switch 240. The stepping switch 239 is of the intermittently operated type whereas the switch 240 is of the single pole double throw type which when the rotor is uncaged engages its make contact 241.

Returning to Figure 2B, intermediate to the amplifier 25 and rudder servomotor 18 is an engage relay 24 shown as a three arm double throw relay having an operating winding 243, and operable arms 244, 245, 246 which coact respectively with relay out contacts 247, 248, 249 and relay in contacts 250, 251 and 252. The out contacts 247, 248 are associated with an operating winding 255 of an anti-engage relay 254 having a single arm 256 which is of the break type coacting with contact 257. The relay arm 246 of relay 24 is associated with the make contact 262 of a two arm switch 259 whose arms 260, 261 coact respectively with make contacts 262, 263. A fader motor control relay 265 which is of the three arm double throw type has an operating winding 266 and arms 267, 268 and 269. The arms 267, 268, 269 coact respectively with relay out contacts 270, 271, 272 and with relay in contacts 273, 274 and 275. Relay 265 controls the operation of a fader motor 286 which may be of the two phase induction type having relay windings 287, 288, phasing capacitor 289 connected across the windings as conventional and a rotor 300. The rotor 300 operates a switch operating mechanism 301. The operating mechanism 301 operates arms 302, 304, 306, and 307 which coact respectively with contacts 303, 305, 308 and 309. The switch arme 302 is operated to terminate extreme clockwise operation of the motor and the arm 304 is operated to terminate extreme counterclockwise rotation of the motor. The arms 302, and 304 may thus be referred to as limit switches. Arm 302 engages contact 303 after arm 304 is disengaged from contact 305 during counterclockwise rotation of the motor. The switch arms 306 and 307 engage their respective contacts 308, 309 at the extreme counterclockwise position of the motor. During counterclockwise rotation of the fader motor it operates through a mechanism A to operate slider 132 of the fader potentiometer 131 in the aileron channel, Figure 1, in its downward direction. In the extreme counterclockwise position of the fader motor, a circuit is also completed for energizing a synchronizing relay 277, as will be more fully described hereinafter. The synchronizing relay is of the three arm double throw type having an operating winding 278 and operable arms 279, 280, 136 which engage respectively without contacts 281, 282, and in contacts 283, 284, 137.

Associated with the manually operable rudder engage switch 259 is a landing gear lock switch 311 having a single throw arm 312 engaged with a contact 313 when the craft is airborn but disengaged therefrom when the craft is ground supported.

The aileron servomotor 117 of Figure 1 is shown in Figure 2A as similar to the rudder servomotor in that it comprised a plurality of field windings, a pulsing clutch winding, an armature, and an armature shunting resistor. The disconnectible clutch of Figure 1, 115 includes as shown in Figure 2A an energizable winding 116. The aileron engage relay 118 in Figure 2A is shown as a two arm double throw type having arms 314, 315 which respectively engage out contacts 316, 317 and relays in contacts 318, 319. An operating winding 320 moves the arms 314, 315 to the in position. In the in position of the relay 118, the amplifier 119 having alternatively operable relays 120, 121 reversibly controls the aileron servomotor 117. In the out position of relay 118, the relays 120, 121 which are shown as of the single pole single make type control a synchronizing motor 154. The motor 154 is of the reversible type and includes field elements consisting of permanent magnets 327, 328. Within the field provided by the magnets is an armature 321 which is shunted by two resistors 324 having a common connection 326 and the resistor 325.

To prevent the engagement of the autopilot with the control surface before the autopilot is electrically balanced to the present attitude of the craft, the energization of the synchronizing motor 154 (which operates slider 129 in the aileron channel to balance the control circuit 126) causes the energization of winding 331 of anti-engage relay 330 whose coil is connected in series with the synchronizing motor. The relay 330 includes an operable arm 332 engageable with an out contact 333.

Engagement of both rudder and aileron channels of the automatic pilot is initiated from a master engage switch 334 having jointly operable arms 335, 336 which engage respectively make contacts 337, 338. The arms are held in operated position by a holding coil 339. In series with arm 335 and contact 337 is a turn control engage lockout switch 342 having an operable arm 343 engageable with contact 344. The switch arm 343 is jointly operable with the turn control slider 186 through an operating means B and with the slider 186 in its normal position at the electrical center of resistor 187 the switch arm 343 engages contact 344. In the same series arrangement is a normally closed disengage switch 346 and a thermal delay switch 347. Switch 347 includes a heater element 348, a heat responsive movable contact 349, and a fixed contact 350.

During turns initiated by the manual turn control, the energization of the roll erection motor of the vertical gyro is interrupted to prevent erection of the gyro rotor to a false vertical. This energization is interrupted by an erection cutout relay 352 having an operating winding 353 for an operable arm 354 normally engaged with a relay out contact 355. Energization of winding 353 is effected through an operable switch 356. Switch 356 includes an operable arm 357 positioned by the yaw rate gyroscope 77 in the rudder channel by a suitable operating means C. The switch arm 357 may engage alternatively with contacts 358, 359 depending upon the direction of craft movement about the vertical axis.

While the rudder engage relay 24, Figure 2B, and the aileron engage relay 118, Figure 2A, permit the amplifiers 25 and 119 to control the operation of the servomotors, an auxiliary relay 361 controls the energization of the disconnectable clutches 15 and 115, Figure 1, which couple the servomotors 18 and 117 to the rudder and aileron control surfaces. The auxiliary relay 361 is of the single throw type and has six arms 362, 363, 364, 365, 366, 367 engageable respectively with relay in contacts 368, 369, 370, 371, 372, and 373. The arms are operated by winding 374 of the relay.

*Operation*

After the aircraft is airborne and has assumed an attitude by manual manipulation of the rudder and aileron surfaces from which it is desired to automatically control and prior to such application of automatic control any unbalance in the control circuit 126 of the aileron channel 12 is reflected in operation of the aileron amplifier 119 which through the out contacts 317, 316 of relay 118 controls the operation of the synchronizing motor 154 to balance the network 126. Thus the circuit 126 is balanced to the roll attitude of the craft. In the aileron channel 12, the coupler clutch winding 211 is deenergized and any heading error signal appearing on synchro winding 195 causes the operation of the amplifier section 194 which in turn controls the operation of the motor section 192 to adjust the synchro rotor winding 195 until no heading error signal exists.

In the rudder channel, the electrical unbalance may be balanced out by the position of slider 37 of the trim potentiometer 36. With the airplane and autopilot trimmed as desired and with the turn control slider 185 at the center of resistor 187, voltage may be applied to the amplifier rectifier 215. When the rectifier is operating to provide a D.C. bias voltage, as stated for the amplifiers, an operating circuit extends from rectifier circuit terminal 223, conductor 376, operating winding 226 of relay 225, conductor 375, to terminal 222. Twenty-eight volts D.C. from the supply flows from conductor 378, Figure 2B, conductor 379, relay contact 288, operated relay arm 227, conductor 380, conductor 381, landing gear operated switch 312, manually operated rudder engage switch arm 261, contact 263, conductor 383, anti-engage contact 257 of anti-engage relay 254, relay arm 256, conductor 384, rudder engage relay operating winding 243, to ground. With the rudder engage relay 24 operating, the relay arms 244, 245, 246 engage their in contacts. With relay arm 246 engaged with in contact 252, the rudder servo-motor 18 is engaged with its control surface by the operation or connection of its clutch 15 effected through a circuit extending from energized conductor 379, conductor 386, rudder engage switch arm 260, switch contact 262, conductor 387, conductor 388, relay arm 246, contact 252, conductor 390, operating winding 17, to ground.

The energization of the servomotor 18 may also be effected from conductor 379, amplifier relay 26 if operated in response to unbalance of network 34, conductor 392, operated relay arm 245, in contact 251, conductor 393, motor field winding 20, pulsing clutch winding 21, armature 22, to ground. Alternatively the motor may be energized by a circuit from amplifier relay 27, conductor 391, relay arm 244, in contact 250, conductor 394, motor winding 19, pulsing clutch 21, armature 22, to ground.

Thus far only the rudder channel of the automatic pilot has been engaged with the aircraft. To effect the engagement of both the aileron and rudder channels of the autopilot to their respective control surfaces, the master engage switch 334, Figure 2A, must be operated. The effective operation of the master engage switch 334 depends upon a preconditioning of the system. The preconditioning of the system involves the following operations. After the A.C. failure relay 225 is controlled by slow acting rectifier tube 221, current flows from energized conductor 380, Figure 2B, conductor 395, switch arm 240 of the stepping solenoid 237, stepping switch 239, to ground. After the operation of the stepping solenoid 237 has uncaged the vertical gyro rotor which in turn has had time to come partially up to speed due to the delay of tube 221 in actuating relay 225, switch arm 240 engages contact 241 to extend a circuit from energized conductor 395, vertical gyro contact arm 240, contact 241, conductor 396, heating element 348 of thermo delay switch 347 to ground. During the interval before the heating element 348 causes the heat responsive arm 349 to engage contact 350 the vertical gyro rotor may be erected to the vertical and the amplifiers 25 and 119 have had time to stabilize. With the heat responsive arm 349 in operated position a circuit extends from energized conductor 396, heat responsive element 349, switch contact 350, conductor 398, manually operable normally closed disengage switch 346, conductor 399, master engage switch contact 337, operated engage switch arm 335, contact 344 of the turn control lockout switch 342, operable arm 343, conductor 401, contact 333 of the anti-engage relay 330, relay arm 332 in unoperated position, conductor 402, out contact 282 of the synchronizing relay 277, relay arm 280, conductor 403, conductor 404, through three parallel circuits, one for operating the holding solenoid 339 for the master engage switch 334, a second for energizing the operating winding 320 of the aileron engage relay 118, and a third for energizing the operating winding 374 of the auxiliary engage relay 361.

The operation of aileron engage relay 118 permits the aileron amplifier 119 to control the energization of the aileron servomotor 117 through the engage relay in contacts 318, 319 in a similar manner by which the rudder amplifier 25 controls the rudder servomotor 18. The aileron sermovotor 117 is connected to the drum 114 by operation of clutch 115 which is effected now from a circuit extending from the main D.C. supply conductor 378, conductor 406, conductor 407, master engage switch contact 338, switch arm 336, conductor 408, operated auxiliary relay arm 364, relay in contact 370, through the clutch operating winding 116 to ground.

The rudder servo is simultaneously engaged with its cabled rum 14 through an operating circuit for clutch 15 extending from energized conductor 380, Figure 2B, conductor 410, auxiliary relay in contact 371, operated relay arm 365, conductor 411, conductor 383, anti-engage relay contact 257, relay arm 256, conductor 384, to the operating winding 243 of the rudder engage relay. The operation of the rudder engage relay 24 completes a clutch energizing circuit from energized conductor 408, Figure 2A, auxiliary relay operated arm 366, in contact 372, conductor 414, conductor 388, rudder engage relay arm 246, contact 252, conductor 390, clutch operating winding 17, and to ground.

With the autopilot thus engaged with its control surfaces and while we have uncaged the vertical gyroscope 170 to permit stabilization of the craft in roll, heading stabilization requires the operation of clutch 210, Figure 1, through its operating winding 211. This energization is effected in the following manner. After auxiliary relay 361, Figure 2A, operated from energized conductor 404, a holding circuit for the relay winding 374 was provided from energized conductor 400, conductor 417, relay arm 362, in contact 368, conductor 418, operating winding 374, to ground. A circuit was now provided for energizing the fader relay 265 from energized conductor 401, Figure 2A, conductor 419, relay in contact 369, operated relay arm 363, conductor 420, fader relay operating winding 266, to ground. Alternating voltage supply is transmitted to the conductor 421, Figure 2B, fader relay arm 267, energized relay contact 273, fader motor limit switch contact 305, limit switch arm 304, conductor 422, through the fader motor field windings 287, 288, to ground. The fader motor as now energized rotates from its extreme clockwise position to its counterclockwise position. At the extreme counterclockwise position, the switch arm 304 is disengaged from contact 305 to terminate operation of the motor whereas limit switch arm 302 engages its contact 303 to permit subsequent motor reverse rotation. With the fader motor in its extreme counterclockwise position, the fader motor operated arm 307 engages its related contact 309. A circuit is completed from the energized conductor 404, Figure 2B (which is energized all the while the autopilot is engaged through the auxiliary relay holding circuit comprising relay arm 362 and relay contact 368), conductor 423, contact 309, fader motor operator arm 307, conductor 424, synchronizing relay operated winding 278 to ground.

During the operation of the fader motor as described, the slider 132 of the fader potentiometer 131 of the aileron channel 12 is moved to its extreme downward position so that no control signal is supplied to the control circuit 126 by the synchronizing potentiometer 128. Consequently, if the autopilot had been engaged with the aircraft control surfaces with the craft in a roll attitude other than wings level (the synchronizer having been balancing out the vertical gyro signal), the synchronizing signal would now have been slowly diminished causing the vertical gyroscope to assume control of the circuit 126 to restore the craft to a level position laterally.

The synchronizing relay 277 establishes a holding circuit for its operating winding 278 extending from energized conductor 404, conductor 403, relay arm 280, in contact 284, operating winding 278, to ground. Thus the synchronizing relay 278 is maintained in an in position when once energized all the while the autopilot is engaged with the control surfaces. The compass clutch coil 211 is now energized from a circuit extending from energized conductor 404, fader motor contact 308, fader motor operated arm 306, fader relay operated arm 269, fader relay in contact 275, conductor 430, clutch operating winding 211, to ground.

After the clutch winding 211 is energized, rotation of the operating section 192 of the coupler 182 in addition to being applied to the synchro rotor winding 195 is also applied to the slider 174 of the heading potentiometer 173. The operated slider 174 controls the balance of the circuit 126 whereby the craft is maintained on a desired heading.

Manual selected changes in heading may be effected by rotating or operating the slider 186 of the turn control potentiometer 185. The displacement of slider 186 is accompanied by the displacement of the switch arm 343, Figure 2A, of the turn control lockout switch 342 whereby the circuit between the energized conductor 400 and its subconductor 401 is interrupted, consequently the fader relay operating winding 266, Figure 2B, is deenergized through the deenergization of conductor 420 and the relay moves to the out position as shown in Figure 2B. With the fader relay arm 269 in its unoperated position, whereby it is disengaged from its in contact 275, conductor 430 is deenergized and the operating means 181 of slider 174 is disconnected from its operating means 192 of the coupler 182. Thus automatic heading control is thereby rendered ineffective to control the control circuit 126 of aileron channel 12.

With the deenergization of the fader relay 266, and its subsequent operation to the out position, the A.C. supply conductor 421 through unoperated relay arm 267, out contact 270, conductor 434, limit switch contact 303, fader motor operated limit switch arm 302, conductor 435, energizes the fader motor field windings 387, 388 which operate in the clockwise direction until its energizing circuit is terminated by the disengagement of fader motor operated arm 302 from its associated contact 303. At this time the limit switch arm 304 engages its contact 305 to permit subsequently counterclockwise rotation of the fader motor 286.

It will now be evident that when the turn control slider 186 is restored to the electrical center of resistor 187 that the switch arm 343 of the turn control lockout switch 342 again engages its contact 344 to complete a circuit for energizing the fader relay operated winding 266. However, the energizing circuit for the clutch winding 211 of the coupler clutch 210 is not completed immediately upon the operation of fader relay 265. A time delay is provided to assure that the craft will have substantially completed its turning motion before the coupler will be operatively connected to the potentiometer 173 in control circuit 126 for automatic heading control. The time delay is effected by the fader motor which on operation of the fader relay 265 causes counterclockwise rotation of the fader motor 286 which must operate the arm 306 into engagement with its associated contact 308 before the circuit may be completed from the energized conductor 404 to the clutch operating winding 211. The engagement of arm 306 with its contact 308 does not occur until the fader motor 286 is at its extreme counterclockwise position and this duration of rotation between the extreme clockwise position to the extreme counterclockwise position provides the time delay. While it has not been clearly shown, it is to be understood that suitable gear ratios or driving ratios may be provided between the fader motor and switch operating mechanism 301 to assure a desired time delay.

During craft changes in heading, both when the change is the result of a transient disturbance on the craft or due to an ordered change in heading from the turn control slider 186, it is desirable to discontinue the energization of the roll erection motor 231 of the vertical gyro 170. This energizing circuit is interrupted between the erection cutout relay arm 354 and its out contact 355 by the operation of the relay 352 whose operating winding 353 may be energized from a circuit extending from D.C. supply conductor 378, Figure 2B, conductor 406, conductor 436, operating winding 353, conductor 437, rate gyro operated switch 356, to ground. A parallel circuit for energizing the erection cutout relay winding 353 is also provided from energized conductor 437, Figure 2A, fader relay arm 268, out contact 271, conductor 438, synchronizing relay arm 279, in contact 283, to ground. Thus through an out contact of the fader relay 265 and an in contact of the synchronizing relay, the erection cutout is effective as soon as operation of the turn control lockout switch arm 343 occurs.

The rate gyro operated arm 357 maintains the energization of the erection cutout operating winding 353 while it is in a rate of turn above its threshold value. Thus a faster erection cutout is achieved for turn control turns and a rate gyro energized erection cutout is still made available for turns not involving the turn control.

While it might appear that the erection cutout relay 352 might be operated through the fader relay arm 268 and out contact 271, it is evident that this circuit also depends upon the synchronizing relay arm 279 and in contact 283. The synchronizing relay is initially energized only when the fader motor is in its extreme counter clockwise position which occurs after the autopilot has been engaged with the aircraft control surfaces. Prior to this time, the roll erection motor 231 has operated to erect the gyroscope rotor to its vertical.

It will be evident that the fader motor 286 operates from an extreme counterclockwise position to an extreme clockwise position and vice versa during manual command turns. In order to avoid introducing a signal into the amplifier control circuit 126 from the synchronizing potentiometer 128 at this time, the synchronizing relay is provided with an operable arm 136 and contact 137 which when operated will effectively bypass the synchronizing potentiometer 128 in Figure 1. Thus no synchronizing signal is applied to the aileron amplifier control circuit 126 after the autopilot has been once engaged.

It will now be evident that by the operation of the fader motor 286 during engagement of the automatic pilot with the aircraft control surfaces that the synchronizing signal from potentiometer 128 whose slider 129 is positioned by the synchronizing motor 154 is gradually removed causing the craft to slowly roll out of any bank angle it may have attained at the time of engagement. Additionally, the fader motor 286 provides a time delay before rendering the compass coupler 182 effective to control the aileron amplifier control circuit 126 following operation of the turn control lockout switch member 343 during manually ordered turns. It is also evident that novel interlocks both electrical and mechanical have been provided to assure the proper conditioning of the autopilot system prior to its engagement with the aircraft and subsequent to engagement.

What is claimed is:

1. Control apparatus for an airplane having control surfaces, said apparatus comprising: a plurality of servomotors, each singularly associated with a control surface of the airplane for the purpose of displacing the same, a plurality of circuits each connected to an individual servomotor for energizing each servomotor for reverse operation thereof, a plurality of movable control members each singularly connected to one of each said circuit for controlling the displacement of a control surface, a disengageable clutch on each servomotor, means controlling each clutch for connecting the servo to the associated control surface, a master engage switch movable between "on" and "off" positions effecting engagement and disengagement of the clutches, holding means retaining the master switch in its "on" position; a vertical gyroscope controlling operation of at least one member and thus one servomotor, and circuit means connected to the vertical gyroscope and closed upon the vertical gyroscope attaining operating condition energizing said holding means.

2. In an automatic pilot for an aircraft having control surfaces for changing craft attitude, a servomotor operating said surfaces; disengageable clutch means connecting said servomotor to said surfaces; a balanceable control system controlling operation of said servomotor; a vertical gyroscope responsive to craft change in attitude unbalancing said system; synchronizing means controlled by said balanceable means during disconnection of said clutch rebalancing said balanceable means; circuit means connected for energizing said clutch means; and switch means connected to said gyroscope and included in said circuit means rendering the same effective, said switch means being operated by uncaging of the gyroscope.

3. In an automatic pilot for an aircraft having a control surface; a servomotor, detachable clutch means connecting said servomotor and control surface; balanceable control means connected to said servomotor; means in said control means for producing a voltage varying in response to changes in craft attitude; further means in said control means for producing a balancing voltage opposed to said attitude voltage during disconnection of said servomotor and surface; circuit means energizing said clutch means; time interval means for continually diminishing the effectiveness of said synchronizing signal in said control means; and additional means for energizing said circuit means and said time interval means to achieve a predetermined craft attitude after engagement while effecting synchronization to any craft attitude prior to engagement.

4. Flight control apparatus for an aircraft having attitude changing means thereon, said apparatus comprising: a servomotor, disconnectable clutch means connecting said servomotor and said attitude changing means; a vertical gyroscope including means uncaging the rotor thereof; a balanceable servomotor control network connected to said servomotor and responsive to attitude changes sensed by said gyroscope; selective means energizing said clutch to connecting condition; and switch means connected to the selective means and operated by uncaging of said gyroscope to render effective said selective means on said clutch means.

5. Flight control apparatus for an aircraft having craft attitude changing means, said apparatus comprising: a first voltage producing means; craft attitude responsive means; a first disconnectable clutch means connecting said attitude responsive means and said first voltage producing means; a balanceable network including said first voltage producing means; a second voltage producing means in said network for opposing said first voltage producing means; a servomotor, a second disconnectable clutch means between said servomotor and craft attitude changing means; motor operated drive means connected to said second voltage producing means for fading out said second voltage during energization of said second or servo clutch means; a third voltage producing means in said network; manually operable means adjusting said third voltage producing means and rendering said first or attitude means clutch ineffective; further means connected to said manually operable means and said motor operated means to effect a delayed return of the attitude means clutch to the connecting condition after return of said manually operable voltage producing means to unoperated position and additional means operatively connecting the balanceable network and servomotor.

6. Control apparatus for an aircraft having attitude changing means, said apparatus comprising; a servomotor; a disconnectable clutch connecting the servomotor and attitude changing means; balanceable control means connected to said servomotor for operation thereof on unbalance of said control means; a first, second, and third voltage producing means in said control means, a craft attitude responsive means operatively connected to said first voltage producing means; synchronizing means operating said second voltage producing means during disconnection of said servomotor clutch; motor operated means connected to the second voltage producing means for "fading out" the second voltage; operable circuit means energizing said motor operated means and connecting said servomotor clutch; manually operable means connected to said third voltage producing means; further means connected with said circuit means and operated by the manually operable means rendering the attitude responsive means operably ineffective on said first voltage producing means; and means responsive to said further means when it is in unoperated position and driven by the motor operated means for delaying further operable effectiveness of the attitude responsive means on said first voltage producing means following return of said manually operable means to unoperated position.

7. The apparatus of claim 6, characterized by the motor operated means comprising a voltage dividing potentiometer with its resistor having its ends connected to output terminals of the second voltage producing means and an adjustable slider movable from one end of the resistor to the other.

8. The apparatus of claim 7, with relay means responsive to operation of the motor means during fading out of the synchronizing signal for rendering said second voltage producing means ineffective in said balanceable control means despite subsequent reverse operation of the motor.

9. Control apparatus for an aircraft having attitude changing means, said apparatus comprising: a craft attitude responsive device; a servomotor positioning the attitude changing means; a manually operable device, a servomotor control means connected to the servomotor and operable by said attitude responsive device and manually operable device; a reversibly operable motor; a first set of limit switches operable by said motor to terminate operation thereof in one direction and a second set of limit switches operable by said motor to terminate operation thereof in the other direction; two position switch means connected to both sets of limit switches to alternatively initiate operation of the motor; means operated by the reversibly operable motor during operation in one direction for rendering said attitude responsive device effective on said control means and during reverse operation rendering said attitude responsive means ineffective on said control means; and means responsive to operation of said manually operable device and connected to effect operation of the two position switch means for causing operation of the motor in the forward or reverse direction.

10. The apparatus of claim 15, wherein the attitude changing means are ailerons and said apparatus additionally includes a third voltage signal producing means in said servomotor control means, a craft heading responsive device, disconnectable means between said heading responsive device and third voltage producing means, and further means rendering said disconnectable means effective to operatively connect the heading device and third producing means and operable when said reversibly operated motor reaches the extreme position where said synchronizing signal is totally ineffective.

11. Control apparatus for an aircraft having craft attitude changing means, said apparatus comprising: a servomotor, a disconnectable clutch connecting the servomotor and attitude changing means upon energization of said clutch; a balanceable servomotor control means connected to said servomotor; said balanceable means including a roll attitude voltage producing means; a craft heading error voltage producing means; a synchronizing signal producing means, and a manually operable turn control signal producing means; an engage circuit energizing said disconnectable clutch to operatively engage the servomotor and attitude changing means comprising in series a limit switch operated by uncaging of said vertical gyroscope, a thermal delay switch energized through said limit switch and actuated at the end of a time interval sufficient for the uncaged gyro rotor to be erected to the vertical, a manually operable disengage switch, a manually operable selective engage switch, and a turn control lockout switch for opening said engage circuit upon operation of the turn controller prior to engagement; and further means responsive to energization of said engage circuit for providing a maintaining circuit for said engage circuit to maintain engagement of the servomotor and attitude changing means during subsequent operation of said turn controller to maintain the energization of the disconnectable clutch.

12. Control apparatus for an aircraft having craft attitude changing means, said apparatus comprising: a servomotor positioning the attitude changing means; a craft attitude responsive device; a manually operable device; servomotor control means connected to the servomotor and operable by said attitude responsive device and manually operable device; a reversibly operable motor; coupling means operated by the motor during operation in one direction toward a normal position connecting said attitude means with said control means for rendering said attitude responsive means ineffective on said control means and during reverse motor operation from said normal position disconnecting the attitude means from the control means rendering said attitude responsive means ineffective on said control means; and further means responsive to operation of said manually operable device toward or from unoperated position causing operation of the motor.

13. In flight control apparatus for an aircraft having attitude changing means, in combination: control apparatus operating the attitude changing means; a course responsive device operating the control apparatus; a manually operable member upon movement from unoperated position operating said control apparatus; further means connecting or disconnecting said course responsive device and said control apparatus; selective means controlling said further means; a time delay device comprising a two position, reversible, self-operation terminating servo system having its operation initiated toward one or the other of said two positions in accordance with the displacement of said manually operable member toward or from a normal unoperated position, said selective means comprising jointly one switch closed directly by said manually operable member upon return thereof to unoperated position and another switch closed by said servo system in one of said positions following a period of operation of said motor, said other switch thus being controlled by said manually operable member through said servo system.

14. In condition control apparatus having a condition changing means, in combination: control apparatus operating the condition changing means; a condition responsive device operating the control apparatus; a manually operable member operating said control apparatus; further means connecting or disconnecting said condition responsive device and control apparatus; selective means controlling said further means; a time delay device including a reversible, self-operation termination servo system connected to the manually operable member and assuming one or the other of two extreme positions and having its operation toward one or the other of said two positions initiated in accordance with the displacement of said manually operable member in or out of a normal unoperated position, said selective means comprising jointly one switch controlled directly by said manually operable member with said operable member in normal position and another switch controlled by said servo system in one of its extreme positions following a period of operation of the servo system consequent upon the one said switch being so controlled.

15. Flight control apparatus for a dirigible craft comprising: attitude responsive means; first means including a clutch operated by said responsive means producing a first voltage varying in response to changes in craft attitude about an axis thereof; second means providing a synchronizing control voltage; servo means connected to the first and second means responsive to said voltages for controlling the attitude of said craft; manual means connected to the servo means and operable from a normal position producing a voltage for changing craft attitude about said axis; further means controlled by the manual means disconnecting the clutch thus rendering said attitude responsive means ineffective on said first voltage producing means when the manual means is operated; time delay means connected to the further means and energized on return of said manual means to normal or unoperated position, said time delay means including a portion operated only after a period of energization of the time delay means; and means responsive to operation of said portion reconnecting said clutch, rendering effective said attitude responsive means on said first voltage producing means.

16. Control apparatus for an aircraft having attitude changing means, said apparatus comprising: a servomotor; a disconnectable servomotor clutch for coupling and thereby engaging said servomotor and attitude changing means; a balanceable voltage servomotor control means connected to said servomotor; first means in said control means producing a signal in accordance with craft attitude changes; second means in said control means and operable thereby producing a synchronizing voltage during disconnection of said servomotor clutch; said second means including fader means to reduce said second signal utilized; a reversibly operated motor operating said fader means; a first set of limit switches operable by said reversibly operated motor to terminate operation thereof in one direction and a second set of limits which is operable by said motor to terminate operation thereof in the other direction; two position switch means connected to both sets of limit switches and to a source of power to initiate operation of the motor; circuit means comprising switch means connected to said servomotor clutch and engaging said clutch on operation of said switch means; manual means both operating said clutch engage switch means, thereby connecting said servomotor and attitude changing means, and operating said two position switch means to cause operation of the reversibly operated motor in a direction that effectively reduces said synchronizing voltage signal.

17. Control apparatus for an aircraft having craft attitude changing means, said apparatus comprising: a voltage responsive servo means operating the attitude changing means; first means producing a voltage varying with the change of attitude of said craft; second means producing a synchronizing control voltage opposing the attitude change voltage; circuit means controlled by the first and second voltage means applying to said servo means a servo control voltage varying as the relative values of said voltages; selectively operable further means; operable clutch means establishing an operable driving connection or disconnection of said servo means and craft attitude changing means; an operable fader motor and fader motor operated means varying said synchronizing voltage to "fade out" the same; and means controlled by said further means and both operating said clutch to establish the connection of said servo means and attitude changing means and operating said fader motor.

18. In control apparatus for an aircraft having a plurality of control surfaces; a plurality of servomotors, a first servomotor associated with one surface, a second servomotor associated with a second surface, for displacement thereof; a separate energizing circuit for each servomotor; two movable members, providing a movable member interconnected in each energizing circuit for control of said circuit to energize a servomotor; operative means including a master engage switch movable from an "off" to an "on" position, jointly with the members effecting completion of the energizing circuits; holding means for retaining the master engage switch in "on" position and thus maintaining the operative means operated; and further means in said holding means controlled by one of the two movable members when such member is already in operated position and despite initial movement of the engage switch to "on" position subsequent to the member being in operated position rendering ineffective the engage switch holding means.

References Cited in the file of this patent

UNITED STATES PATENTS

| | | |
|---|---|---|
| 2,611,560 | Harcum et al. | Sept. 23, 1952 |
| 2,634,391 | Rusler | Apr. 7, 1953 |
| 2,663,519 | Rossire | Dec. 22, 1953 |
| 2,740,082 | Sedgfield | Mar. 27, 1956 |